United States Patent
Miyaoka

(12) 
(10) Patent No.: US 6,249,490 B1
(45) Date of Patent: Jun. 19, 2001

(54) MAGNETO-OPTICAL RECORDING/ REPRODUCING METHOD AND APPARATUS

(75) Inventor: Yasuyuki Miyaoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/325,560

(22) Filed: Jun. 4, 1999

(30) Foreign Application Priority Data

Jun. 10, 1998 (JP) .................................................. 10-162080

(51) Int. Cl.$^7$ ...................................................... G11B 11/00
(52) U.S. Cl. .................................................. 369/13; 369/54
(58) Field of Search ............................... 369/13, 54, 110, 369/116, 14, 58; 360/59, 114; 365/122

(56) References Cited

U.S. PATENT DOCUMENTS

| | | | |
|---|---|---|---|
| 5,091,897 | 2/1992 | Otokawa et al. | 369/13 |
| 5,233,578 | 8/1993 | Yamamoto et al. | 369/13 |
| 5,398,227 | 3/1995 | Miyaoka et al. | 369/116 |
| 5,475,666 | * 12/1995 | Ito et al. | 369/54 |
| 5,485,433 | * 1/1996 | Satomura et al. | 369/13 |
| 5,587,975 | * 12/1996 | Kobayashi | 369/13 |
| 5,825,724 | * 10/1998 | Matsumoto et al. | 369/13 |
| 5,831,943 | * 11/1998 | Kurita et al. | 369/13 |
| 5,953,289 | 9/1999 | Miyaoka | 369/13 |

FOREIGN PATENT DOCUMENTS 6-290496  10/1994  (JP) .

* cited by examiner

*Primary Examiner*—Tan Dinh
(74) *Attorney, Agent, or Firm*—Fitzpatrick, Cella, Harper & Scinto

(57) ABSTRACT

A method of determining a strength of a reproducing magnetic field for an apparatus for reproducing information from a magneto-optical recording medium by applying an optical beam to the magneto-optical recording medium while the reproducing magnetic field is applied, the magneto-optical recording medium including a record storage layer and a domain wall displacement layer both made of a magnetic film, and the method including the steps of: recording a test signal having a predetermined pattern on the medium; applying the reproducing magnetic field to the medium by changing the strength thereof and at the same time scanning the medium with the optical beam to reproduce the recorded test signal; and detecting an amplitude of the reproduced test signal and setting as the strength of the reproducing magnetic field a value of a predetermined margin added to the strength of the reproducing magnetic field applied when the amplitude satisfying a predetermined condition is detected.

11 Claims, 8 Drawing Sheets

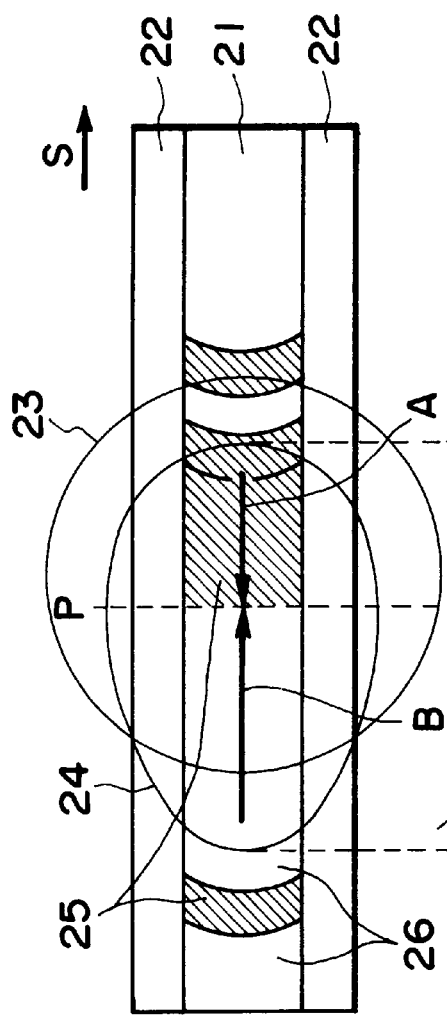
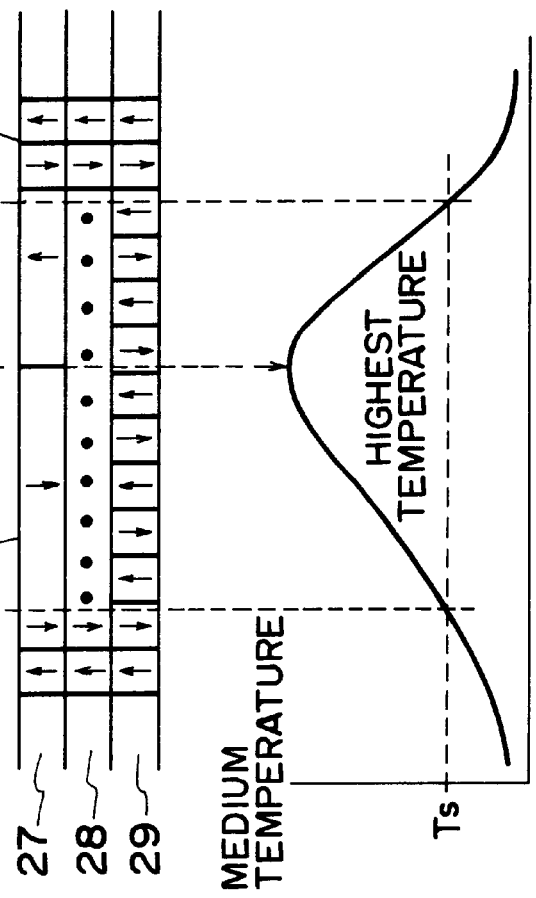
FIG. 2A (PRIOR ART)
FIG. 2B (PRIOR ART)
FIG. 2C (PRIOR ART)

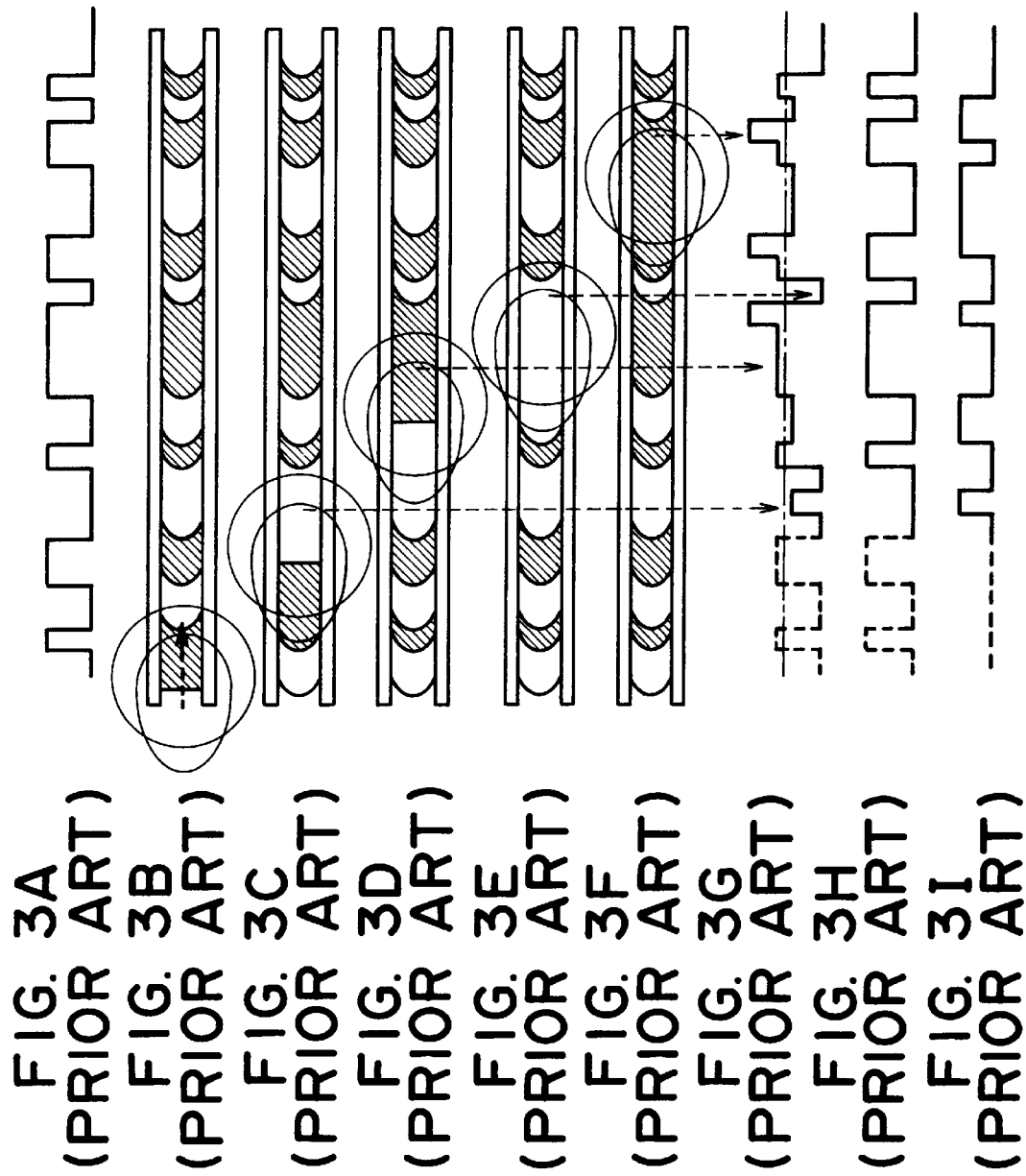

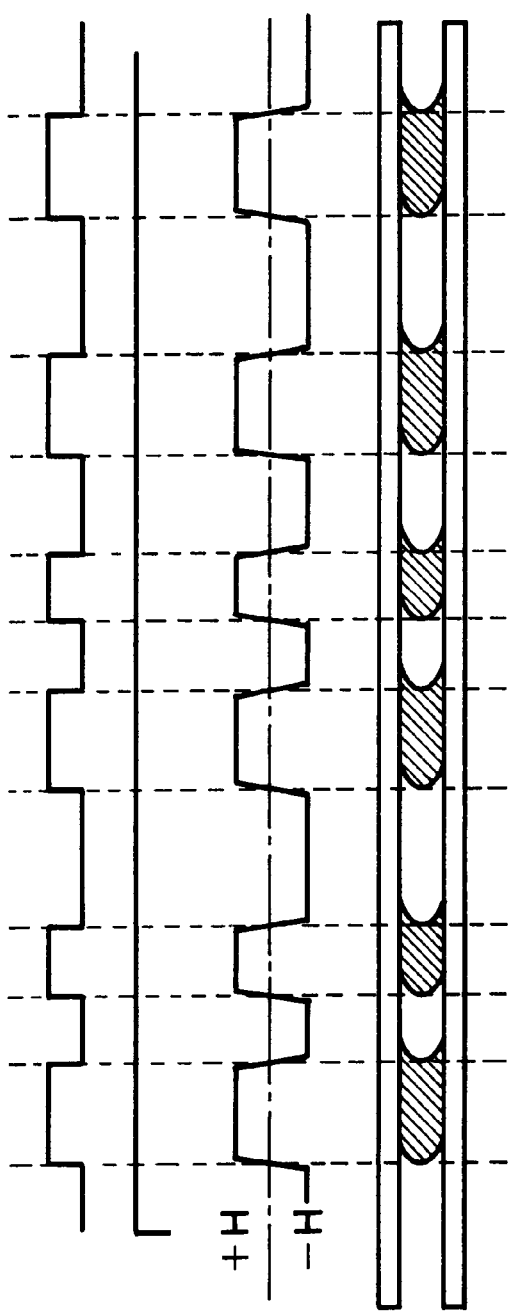

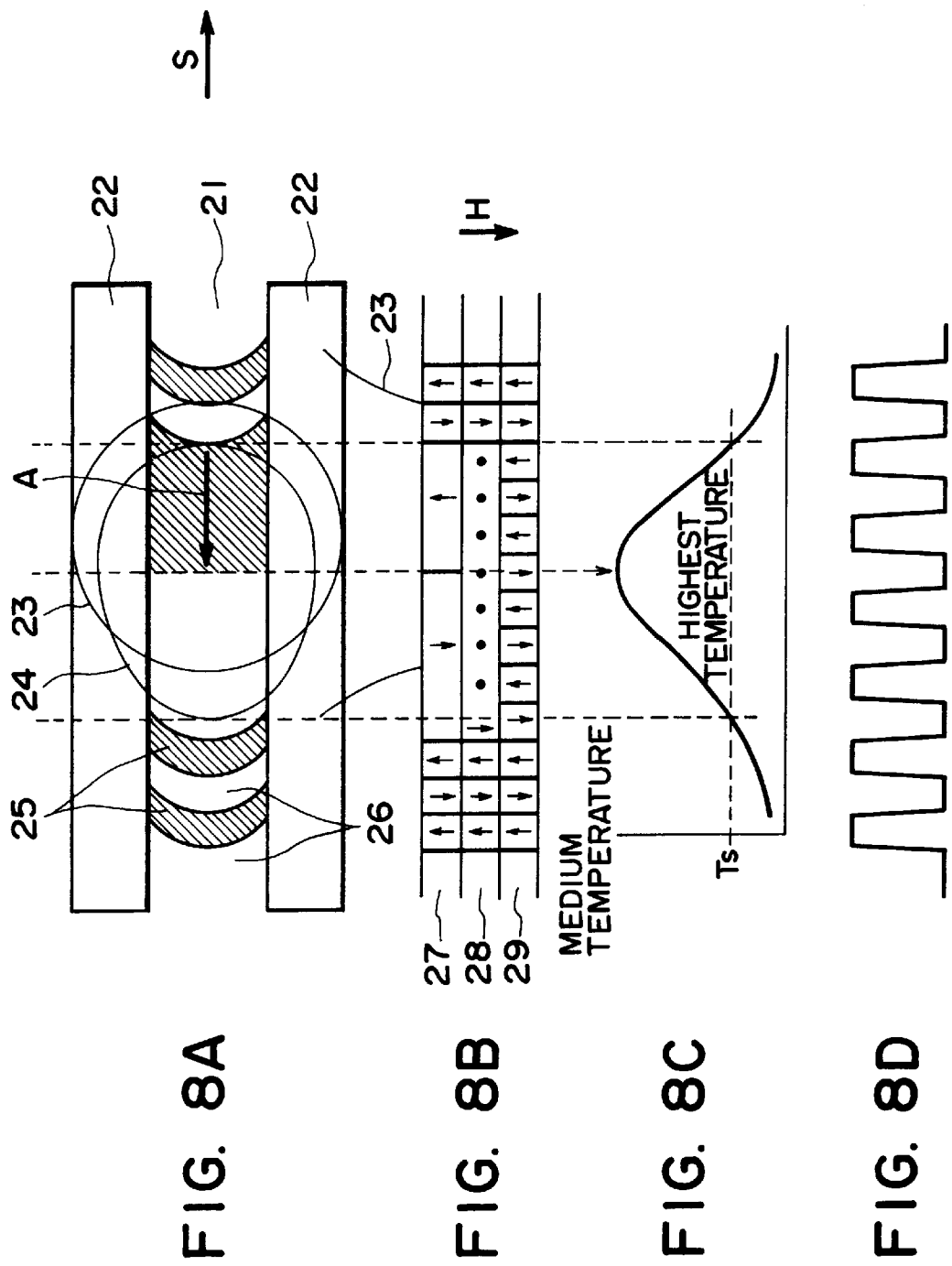

MAGNETO-OPTICAL RECORDING/ REPRODUCING METHOD AND APPARATUS

BACKGROUND OF THE INVENTION

1. Field of the Invention

The present invention relates to a magneto-optical recording/reproducing method and apparatus capable of reproducing record marks by displacing domain walls of record marks in a reproducing layer by utilizing a temperature distribution gradient generated upon application of an optical beam to a magneto-optical recording medium having a multi-layer film structure, without changing record data in a record storage layer, and by detecting a change in a polarizing plane of a reflected optical beam.

2. Related Background Art

A magneto-optical recording medium of an erasable high density record type is known in which information is recorded by writing magnetic domains in a magnetic thin film with thermal energy supplied from a semiconductor laser and the information is read by utilizing the magneto-optical effect. Needs for increasing the record density of a magneto-optical recording medium to realize a high capacity have recently increased.

A linear record density of a magneto-optical recording medium or disk depends greatly on a laser wavelength and a numerical aperture NA of an objective lens of a reproducing optical system. Specifically, since a diameter of a beam waist is determined from a laser wavelength λ and a numerical aperture NA of an objective lens of the reproducing optical system, a detection limit of a spatial frequency during reproduction of record magnetic domains is about 2 NA/λ. In order to realize high density in a conventional magneto-optical disk, it is necessary to shorten the laser wavelength and increase the NA of an objective lens, respectively, of the reproducing optical system. There is a limit, however, in improving the laser wavelength and objective lens NA. For this reason, techniques of improving a record density have been developed by devising the structure of a recording medium and a read method.

For example, Japanese Patent Application Laid-open No. 06-290496 proposes a signal reproducing method and apparatus. With this method and apparatus, signals are recorded in a record storage layer of a multi-layer film constituted of a reproduction (domain wall displacement) layer and a magnetically coupled record storage layer. Domain walls of magnetic domains in the reproducing layer are displaced by utilizing a temperature gradient of a recording medium generated upon application of a heating optical beam, without changing record data in the record storage layer, the reproducing layer is magnetized so that almost all of the area of the reproducing optical beam spot has the same magnetization state, and a change in the polarized plane of a reflected reproducing optical beam is detected to reproduce recorded magnetic domains which are at the refraction limit or more of the optical system.

With this method, recorded magnetic domains having a period shorter than a diffraction limit of an optical system can be reproduced. Therefore, the record density and transfer speed of a magneto-optical recording medium can be considerably improved.

A recording/reproducing system using one beam in the signal reproducing method and apparatus disclosed in the above-cited publication will be described.

The structure of a photomagnetic recording/reproducing apparatus using a one beam recording/reproducing method will be described with reference to FIG. 1. In FIG. 1, reference numeral 1 represents a magneto-optical disk which has a magnetic lamination film 3 and a protection film 4 formed on a substrate 2 made of glass or plastics. The magnetic lamination film 3 has a record storage layer and a domain wall displacement layer. Recorded magnetic domains can be reproduced by displacing domain walls of recorded magnetic domains in the domain wall displacement layer to broaden the magnetization area in a reproducing optical beam spot by utilizing a temperature distribution gradient generated upon application of an optical beam, without changing the record data in the record storage layer, and by detecting a change in a polarizing plane of a reflected optical beam. The magneto-optical disk 1 is supported by a spindle motor with a magnet chuck or the like, and is rotatable about the rotary shaft of the spindle motor.

Reference numerals 5 to 13 represent components constituting an optical head for applying a laser beam to the magneto-optical disk 1 and obtaining information from a reflected optical beam. Reference numeral 6 represents a condensing lens, reference numeral 5 represents an actuator for driving the condensing lens, reference numeral 7 represents a semiconductor laser as a light beam source, reference numeral 8 represents a collimator lens for converting an optical beam into a parallel light beam, reference numeral 9 represents a beam splitter for separating an optical beam, reference numeral 10 represents a λ/2 plate, reference numeral 11 represents a polarizing beam splitter, reference numeral 13 represents a photosensor, reference numeral 12 represents a condensing lens for condensing an optical beam toward the photosensor, and reference numeral 14 represents a differential amplifier for differentially amplifying signals having different polarizing directions.

A laser beam emitted from the semiconductor laser 7 is applied to the substrate 2 of the magneto-optical disk 1 via the collimator lens 8, beam splitter 9 and condensing lens 6. In this case, the condensing lens 6 is displaced along the focussing direction and tracking direction under the control of the actuator 5 so that the laser beam is focussed upon the magnetic lamination film 3, and also tracks a guide groove formed on the magneto-optical disk 1. An optical path of a laser beam reflected at the magneto-optical disk 1 and passed through the condensing lens 6 is changed by the beam splitter 9 toward the polarizing beam splitter 11. The laser beam is then picked up by the photosensors 13 as optical beams having different polarization angles depending upon the polarity of magnetization in the magnetic lamination film 3, via the λ/2 plate 10, polarizing beam splitter 11 and condensing lens 12. The outputs of the photosensors 13 are differentially amplified by the differential amplifier 14 which outputs a magneto-optical signal.

A controller 16 controls an LD driver 15, a magnetic head driver 18 and the like by supplying a record power, a recording signal and the like in accordance with input information such as a revolution number of the magneto-optical disk 1, a track position, a record radius, a record sector, a record start timing, a reproduction timing and the like. The LD driver 15 drives the semiconductor laser 7 while controlling the record power and reproduction power.

Reference numeral 17 represents a magnetic head for applying a modulating magnetic field to an area of the magneto-optical disk 1 where the laser beam is applied during the recording operation, and for applying a DC magnetic field during the reproducing operation. The magnetic head 17 is disposed facing the condensing lens 6, with the magneto-optical disk 1 being interposed therebetween, and is displaced to a proper position during the recording/reproducing operation.

During the recording operation, the LD driver 15 drives the semiconductor laser 7 with a DC record power, and at the same time a magnetic head driver 18 drives the magnetic head 17 to generate a magnetic field having a polarity corresponding to the recording signal. For example, record magnetic domains are formed through a magnetic field modulation record method.

The magnetic head 17 and the magnetic head driver 18 for magnetic field modulation are used for applying a DC reproducing magnetic field during the reproducing operation.

As the laser beam is applied, the magnetic head 17 displaces in a radial direction of the magneto-optical disk 1 to sequentially apply a magnetic field to the magnetic lamination film 3 in the area where the laser beam is applied to thereby record and reproduce information.

The magneto-optical signals are differentially amplified by the differential amplifier 14 whose output is supplied to a binarization circuit, PLL circuit, modulator circuit and the like (not shown) to reproduce information.

The guide groove of the magnetic lamination film 3 was formed in advance by annealing a guide groove area of the record medium at a high temperature to decompose it and not to make the domain wall of each recorded magnetic domain become a closed loop magnetic domain. This process facilitates a displacement of the domain wall.

The reproducing operation will be described with reference to FIGS. 2A to 2C. FIG. 2A is a top view showing a magnetic domain pattern on a domain wall displacement layer, FIG. 2B is a schematic cross sectional view of each magnetic layer, and FIG. 2C shows a temperature distribution of a medium.

In FIGS. 2A and 2B, reference numeral 21 represents a land, reference numeral 22 represents an annealed groove, reference numeral 23 represents an optical beam, reference numeral 24 represents a constant temperature line Ts, reference numeral 25 represents a downward magnetic domain, reference numeral 26 represents an upward magnetic domain, reference numeral 27 represents a domain wall displacement layer, reference numeral 28 represents a switching layer, and reference numeral 29 represents a record storage layer. S indicates a displacement direction of an optical beam, P indicates a domain wall arrival point, A indicates a domain wall displacement from an upstream area of the optical beam, and B indicates a domain wall displacement from a downstream area of the optical beam.

As shown in FIG. 2A, the magneto-optical medium is heated with an optical beam 23 to a temperature at which domain walls in the domain wall displacement layer can displace. Under this temperature condition, the constant temperature line 24 in a region above a critical temperature Ts of the medium at which domain walls can start displacing, becomes as shown in FIG. 2A. As shown in FIG. 2B, the record state of the record storage layer does not change, and the switching layer maintains constant in the temperature range equal to or higher than the critical temperature Ts of the medium. In the domain wall displacement layer, the magnetization state changes at the highest temperature. Different magnetization states exist both in the upstream and downstream areas along the optical beam advance direction. The domain walls displace both in upstream and downstream directions of the optical beam.

As shown in FIG. 2C, the highest temperature in the raised temperature area exists in the area where the optical beam is applied. A reproduction signal is obtained by synthesizing a signal generated by a displacement of a domain wall toward the highest temperature to be caused by the temperature gradient in the upstream area of the optical beam and a signal generated by a displacement of a domain wall toward the highest temperature to be caused by the temperature gradient in the downstream area of the optical beam.

FIGS. 3A to 3I are diagrams illustrating the read operation by the apparatus shown in FIG. 1. FIG. 3A is a diagram showing the waveform of a recording signal, FIGS. 3B to 3F are top views of record mark trains, and FIGS. 3G to 3I are diagrams of the waveforms of reproduced signals.

In FIGS. 3B to 3F showing the record mark trains, a circle mark with perfect circularity indicates an optical beam radiation area, and an ellipsoid mark narrowing along the downstream direction indicates an area higher than the critical temperature. By reproducing the record mark trains shown in FIGS. 3B to 3F formed by the recording signal shown in FIG. 3A, a reproduction signal shown in FIG. 3G is obtained while the record magnetic domains change with the advance of the optical beam as shown in FIGS. 3B to 3F. As described earlier, the signal shown in FIG. 3G is a signal shown in FIG. 3H generated by a displacement of the domain wall from the upstream area along the optical beam advance direction, superposed upon a signal shown in FIG. 3I generated by a displacement of the domain wall from the downstream area along the optical beam advance direction.

A change in the reproduction signal generated by a displacement of the domain wall from the downstream area along the optical beam advance direction may disturb the reproduction signal generated by a displacement of the domain wall from the upstream area along the optical beam advance direction, and the former signal is not necessary.

As one means for preventing a displacement of a domain wall from the downstream area along the optical beam advance direction, it has been proposed to apply a reproducing magnetic field. As a proper reproducing magnetic field is applied, a re-transfer of the domain wall from the downstream area along the optical beam advance direction, or a displacement of a domain wall of a re-transferred magnetic domain, can be suppressed. Therefore, the final reproduction signal is only a signal generated by a displacement of the domain wall from the upstream area along the optical beam advance direction. In this case, the displacement speed of a domain wall is high and the same magnetization state in the optical beam spot area occupies a half or more of the beam spot area while the domain wall displaces. Therefore, the reproduction signal or magneto-optical signal becomes rectangular.

However, if this means for applying a reproducing magnetic field is applied to the above-described conventional magneto-optical recording/reproducing apparatus, the strength of a reproducing magnetic field to be applied to a portable medium changes with the characteristics of each magneto-optical recording/reproducing apparatus.

The strength of a reproducing magnetic field to be applied also changes with each magneto-optical recording/reproducing apparatus because of a difference in the shape of an optical beam and hence a difference in a temperature distribution on a recording/reproducing medium.

The strength of a reproducing magnetic field to be applied also changes with an environmental temperature which influences the temperature distribution of the medium.

Since there are such changes in the strength of a reproducing magnetic field, a reproducing magnetic field having an insufficient or excessive strength may be applied. As a result, a displacement of the domain wall from the downstream area along the optical beam advance direction cannot be suppressed, and this signal generated by a displacement of the domain wall from the downstream area along the optical beam advance direction is superposed upon the signal generated by a displacement of the domain wall from the upstream area along the optical beam advance direction.

Therefore, a margin of the amplitude of a reproduction signal reduces and an error rate of reproduced signals increases, so that the recorded signals cannot be reproduced correctly.

SUMMARY OF THE INVENTION

It is an object of the present invention to provide an information reproducing method and an information recording/reproducing apparatus capable of solving the above-described problems associated with conventional techniques, reducing an error rate during the reproducing operation, and correctly reproducing record data.

The above object of the invention can be achieved by a method of determining a strength of a reproducing magnetic field for an apparatus for reproducing information from a magneto-optical recording medium by applying an optical beam to the magneto-optical recording medium while the reproducing magnetic field is applied, the magneto-optical recording medium including a record storage layer and a domain wall displacement layer both made of a magnetic film, the method comprising the steps of: recording a test signal having a predetermined pattern on the medium; applying the reproducing magnetic field to the medium by changing the strength thereof and at the same time scanning the medium with the optical beam to reproduce the recorded test signal; and detecting an amplitude of the reproduced test signal and setting as the strength of the reproducing magnetic field a value of a predetermined margin added to the strength of the reproducing magnetic field applied when the amplitude satisfying a predetermined condition is detected.

The above object of the invention can be achieved by an apparatus for recording and reproducing information in and from a magneto-optical recording medium, comprising: an optical head for applying an optical beam to the medium to record and reproduce the information; a magnetic head for applying a magnetic head to a region of the medium where the optical beam is applied, the magnetic head applying a modulated magnetic field to the medium when the information is recorded, and applying a reproducing magnetic field when the information is reproduced; means for displacing the medium relative to the optical head and magnetic head; and setting means for setting a strength of the reproducing magnetic field, the setting means recording a test signal having a predetermined pattern on the medium by using the optical head and magnetic head, applying the reproducing magnetic field to the medium by changing the strength thereof by using the magnetic head and at the same time reproducing the recorded test signal by using the optical head, detecting an amplitude of the reproduced test signal, and setting as the strength of the reproducing magnetic field a value of a predetermined margin added to the strength of the reproducing magnetic field applied when the amplitude satisfying a predetermined condition is detected.

BRIEF DESCRIPTION OF THE DRAWINGS

FIGS. 2A, 2B and 2C are diagrams illustrating the reproducing operation of the apparatus shown in FIG. 1;

FIGS. 3A, 3B, 3C, 3D, 3E, 3F, 3G, 3H and 3I are diagrams illustrating a sequence of the reproducing operation by the apparatus shown in FIG. 1;

FIGS. 7A, 7B, 7C and 7D are diagrams illustrating the recording operation of the apparatus shown in FIG. 4; and FIGS. 8A, 8B, 8C and 8D are diagrams illustrating the reproducing operation of the apparatus shown in FIG. 4.

DETAILED DESCRIPTION OF THE PREFERRED EMBODIMENTS

Figure 1:
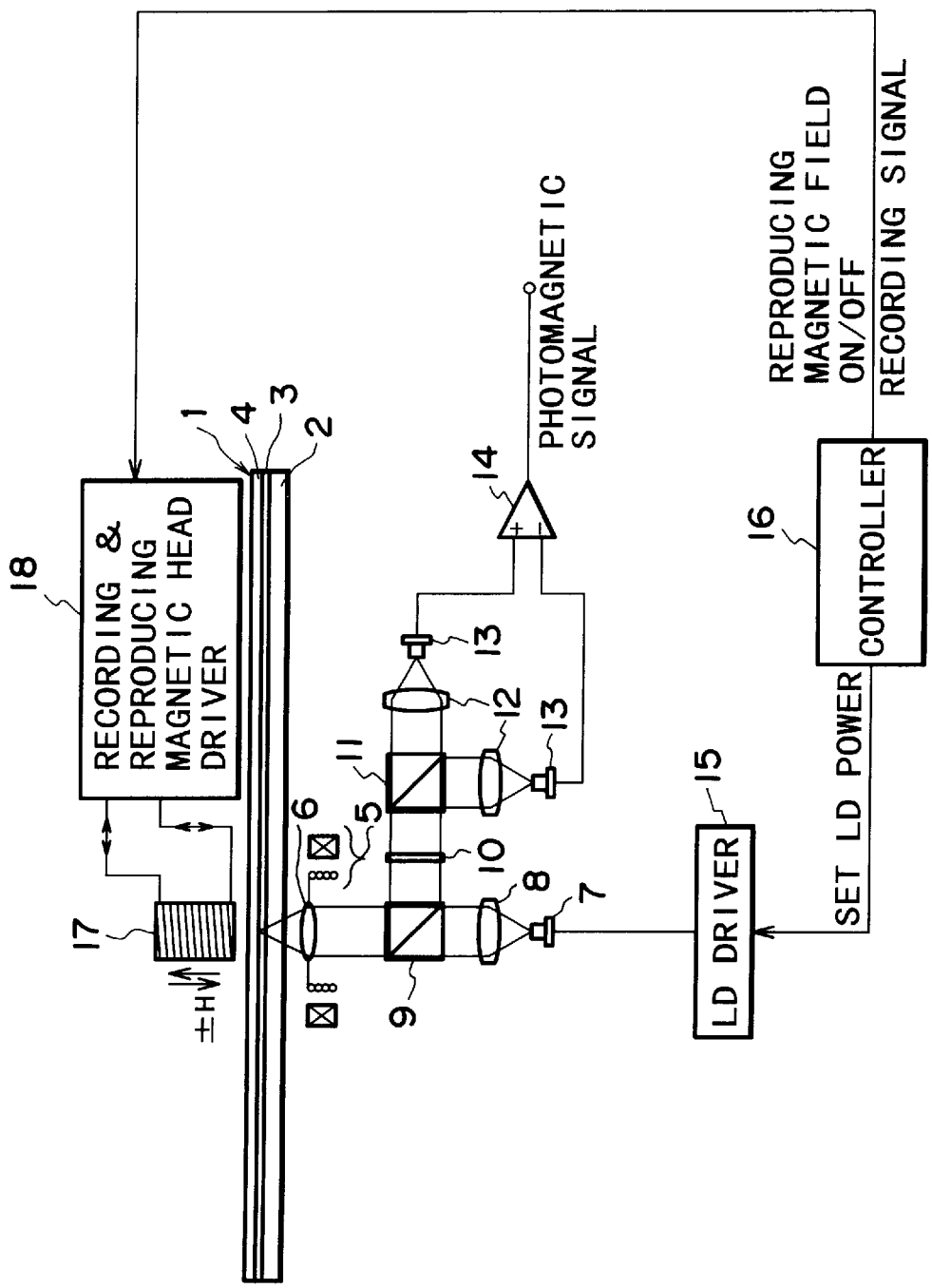
FIG. 1 is a schematic diagram showing an example of the structure of a conventional photomagnetic information recording/reproducing apparatus.
Figure 4:
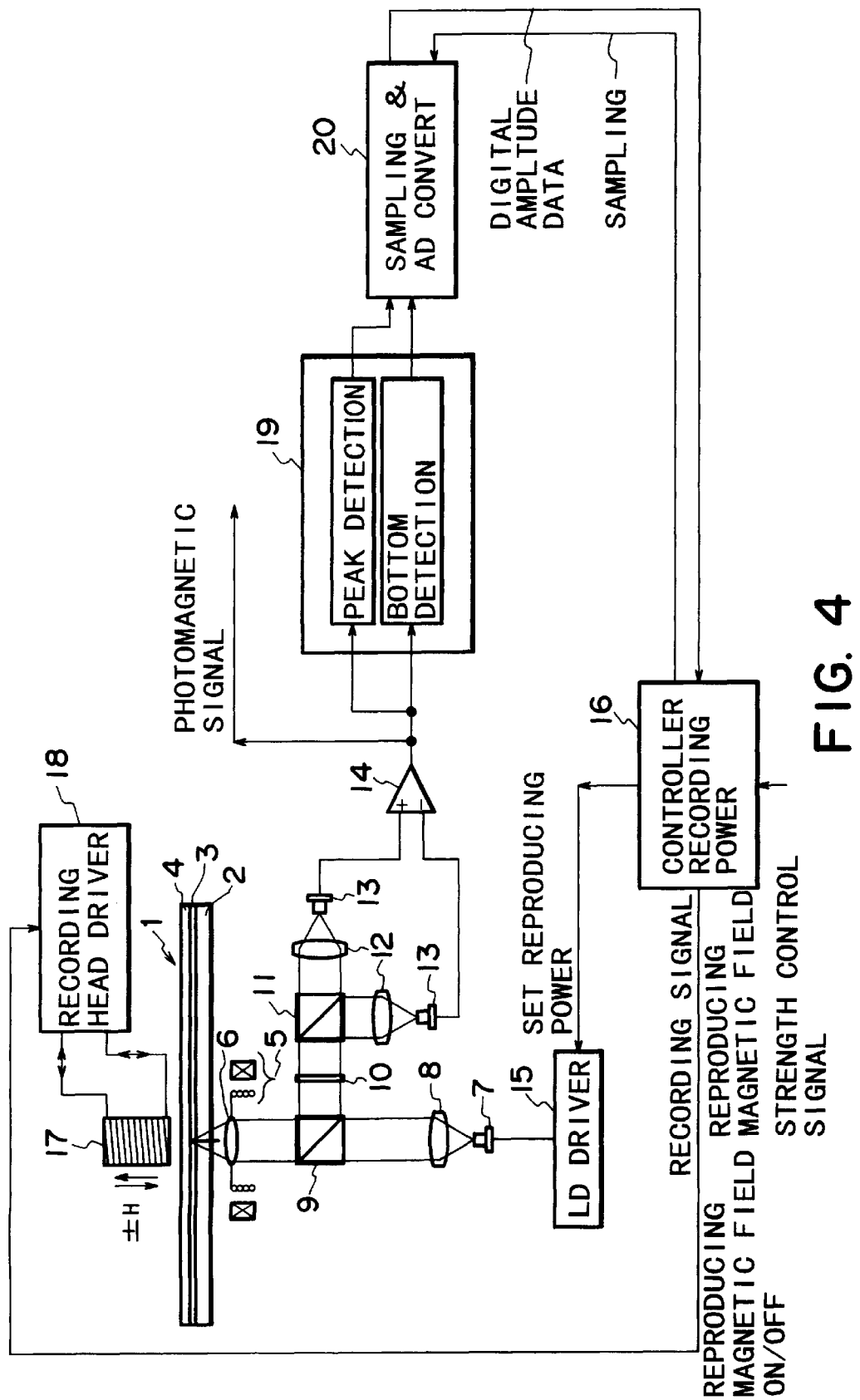
FIG. 4 is a schematic diagram showing the structure of a magneto-optical information recording/reproducing apparatus according to an embodiment of the invention.

The structure of a magneto-optical recording/reproducing apparatus according to an embodiment of the present invention is shown in FIG. 4. In FIG. 4, reference numeral 1 represents a magneto-optical disk which has a magnetic lamination film 3 and a protection film 4 formed on a substrate 2 made of glass or plastics. The magnetic lamination film 3 has a record storage layer and a reproduction (domain wall displacement) layer. Record marks can be reproduced by displacing domain walls of the record marks in the reproduction (domain wall displacement) layer to broaden the magnetization area in a reproducing optical beam spot by utilizing a temperature distribution gradient generated upon application of an optical beam, without changing the recorded data in the record storage layer, and by detecting a change in a polarizing plane of a reflected optical beam. The magneto-optical disk 1 is supported by a spindle motor with a magnet chuck or the like, and is rotatable about the rotary shaft of the spindle motor. Reference numerals 5 to 13 represent components constituting an optical head for applying a laser beam to the magneto-optical disk 1 and obtaining information from a reflected optical beam. Reference numeral 6 represents a condensing lens also called an objective lens, reference numeral 5 represents an actuator for driving the condensing lens 6 for focussing and tracking, reference numeral 7 represents a semiconductor laser for emitting an optical beam, reference numeral 8 represents a collimator lens for converting an optical beam into a parallel light beam, reference numeral 9 represents a beam splitter for separating an optical beam, reference numeral 10 represents a $\lambda/2$ plate, reference numeral 11 represents a polarizing beam splitter, reference numeral 13 represents a photosensor for photoelectric conversion, reference numeral 12 represents a condensing lens for condensing an optical beam toward the photosensor 13, reference numeral 14 represents a differential amplifier for differentially amplifying signals having different polarizing directions, reference numeral 15 represents an LD driver for driving the semiconductor laser 7 while controlling the record power and reproduction power.

Reference numeral 19 represents an envelope detector for detecting an envelope of a magneto-optical reproduction signal, reference numeral 20 represents a sampling and A/D converting circuit constituted of a peak detection circuit and a bottom detection circuit for sampling a peak detection value and a bottom detection value and converting them into digital signals which are output to a controller 16. The controller 16 controls the LD driver 15, a magnetic head driver 18 and the like in accordance with input information such as a rotation speed of the magneto-optical disk 1 and the like. Reference numeral 17 represents a magnetic head.

The operation of this embodiment will be described. A laser beam emitted from the semiconductor laser 7 is applied to the magneto-optical disk 1 via the collimator lens 8, beam splitter 9 and condensing lens 6. In this case, the condensing lens 6 is displaced along the focussing direction and tracking direction under the control of the actuator 5 so that the laser beam is focussed upon the magnetic lamination film 3, and also tracks a guide groove formed on the magneto-optical disk 1.

An optical path of a laser beam reflected at the magneto-optical disk 1 and passed through the condensing lens 6 is changed by the beam splitter 9 toward the polarizing beam splitter 11. The laser beam is then picked up by the photosensors 13 as optical beams having different polarization angles depending upon the polarity of magnetization by the magnetic lamination film 3, via the λ/2 plate 10, polarizing beam splitter 11 and condensing lens 12. The outputs of the photosensors 13 are differentially amplified by the differential amplifier 14 which outputs a magneto-optical signal.

Next, the envelope detector 19 detects the envelope of the magneto-optical signal to obtain peak and bottom values of the signal amplitude. This data is supplied to the sampling and A/D converting circuit 20. The sampling and A/D converting circuit 20 samples the peak and bottom detection values in each reproducing magnetic field changed at each reproducing magnetic field test, in accordance with a sampling control signal supplied from the controller 16. The sampled data is then converted into digital signals which are supplied to the controller 16.

The controller 16 controls the magnetic head driver 18 by supplying a recording signal, a reproducing magnetic field strength control signal or the like, and the LD driver 15 by supplying a recording/reproducing power setting signal and the like, in accordance with input information such as a revolution number of the magneto-optical disk 1, a record radius, a record sector and the like. The LD driver 15 drives the semiconductor laser 7 while controlling the record power and reproduction power in this embodiment. The controller 16 also controls the reproducing magnetic field strength for each reproducing magnetic field test, controls sampling a reproduction signal amplitude during the reproducing magnetic field test, and averages sampled digital data at each reproducing magnetic field.

The magnetic head 17 applies a modulating magnetic field to an area of the magneto-optical disk 1 where the laser beam is applied during the recording operation, and applies a DC magnetic field during the reproducing operation. The magnetic head 17 is disposed facing the condensing lens 6, with the magneto-optical disk 1 being interposed therebetween. During the recording operation, the LD driver 15 drives the semiconductor laser 7 with a DC record power, and at the same time the magnetic head driver 18 as a magnetic field modulation driver drives the magnetic head 17 to generate a magnetic field having a polarity corresponding to the recording signal.

The magnetic head 17 and magnetic head driver 18 are used for applying a reproducing magnetic field having a desired strength during the reproducing operation under the control of the controller 16. In this embodiment, the magnetic head 17 is used as both a recording magnetic field head and a reproducing magnetic field head. It is not necessary to use the same magnetic head 17 for both purposes; discrete recording and reproducing magnetic field heads may also be used. As the laser beam is applied, the magnetic head 17 is displaced in a radial direction of the magneto-optical disk 1 to sequentially apply a magnetic field to the magnetic lamination film 3 in the area where the laser beam is applied to thereby record information.

In this embodiment, although a magnetic field modulation record method is used, other methods may also be used such as an optical modulation record method and a pulse assisted magnetic field modulation record method.

The guide grooves of the magnetic lamination film 3 surrounding the land of the record area are formed in advance by annealing guide groove areas of the record medium at a high temperature by applying a high output power laser to decompose the guide groove areas and make the domain wall of each record mark so as not to constitute a closed loop. This process facilitates a high speed displacement of the domain wall and makes it possible to obtain a reproduction signal of high quality.

Next, the recording/reproducing operation for a domain wall displacement medium will be described.

First, the recording operation for a domain wall displacement medium according to the embodiment will be described with reference to FIGS. 7A to 7D. FIG. 7A shows a recording signal externally input to the controller 16, FIG. 7B shows a record power supplied from the semiconductor laser 7, FIG. 7C shows a modulation magnetic field which is controlled by the controller 16, and FIG. 7D shows a record mark train recorded with the magnetic head 17.

In order to record the recording signal shown in FIG. 7A, a predetermined record power such as shown in FIG. 7B is supplied at the start of the recording operation, and a modulation magnetic field such as shown in FIG. 7C corresponding to the recording signal shown in FIG. 7A is applied. During the recording operation, as the record medium cools, a record mark train such as shown in FIG. 7D is recorded on the record storage layer. A hatched portion and a blank portion shown in FIG. 7D are magnetic domains having opposite magnetization directions.

The reproducing operation will be described with reference to FIGS. 8A to 8D. A record medium having a three-layer structure is used by way of example. The record medium has a record storage layer for storing record marks, a domain wall displacement layer directly contributing to a reproduction signal, in which layer domain walls displace, and a switching layer which switches between coupling states of the record storage layer and domain wall displacement layer. FIG. 8A is a schematic diagram showing a magnetic domain reproducing state of a domain wall displacement layer. FIG. 8B illustrates the states of a domain wall displacement layer, a switching layer and a record storage layer, FIG. 8C shows the temperature state of the medium, and FIG. 8D shows a reproduction signal.

In FIGS. 8A and 8B, reference numeral 21 represents a land, reference numeral 22 represents an annealed groove, reference numeral 23 represents an optical beam, reference numeral 24 represents a constant temperature line Ts, reference numeral 25 represents a downward magnetic domain, reference numeral 26 represents an upward magnetic domain, reference numeral 27 represents a domain wall displacement layer, reference numeral 28 represents a switching layer, and reference numeral 29 represents a record storage layer. S indicates a displacement direction of an optical beam, A indicates a domain wall displacement from an upstream area of the optical beam, and H indicates a direction of applying a reproducing magnetic field.

The switching layer shown in FIG. 8B is coupled to the record storage layer 29 and domain wall displacement layer 27 in a temperature range lower than the critical temperature Ts. As shown in FIG. 8A, as the domain wall displacement medium is heated to the critical temperature Ts or higher whereat domain walls in the reproduction (domain wall displacement) layer can displace, the switching layer 28 reaches the Curie temperature so that the exchange coupling between the domain wall displacement layer 27 and record storage layer 29 disappears.

Therefore, immediately when the temperature of the medium reaches the critical temperature Ts, the domain wall in the domain wall displacement layer displaces to the position where the domain wall is most stable relative to the temperature gradient in the domain wall displacement layer, i.e., to the position where the domain wall traverses the land at the highest temperature in the linear record density direction, the temperature being raised upon application of the optical beam. The area higher than the critical temperature Ts exists both in the upstream and downstream areas in the optical beam advance direction.

Therefore, if a reproducing magnetic field is not applied, transfer and displacement of a domain wall to the domain wall displacement layer occur at the same time in the downstream area in the optical beam advance direction at a temperature equal to or higher than the critical temperature Ts. This domain wall displacement phenomenon generates a reproduction signal which is superposed upon a reproduction signal generated by the domain wall displacement phenomenon in the upstream area in the optical beam advance direction at a temperature equal to or higher than the critical temperature Ts.

If a reproducing magnetic field is applied in this state, the following phenomenon occurs which has been confirmed to date. Transfer or displacement after the transfer of a domain wall is suppressed in the downstream area in the optical beam advance direction at the boundary of the area equal to or higher than the critical temperature Ts. Therefore, as the reproducing magnetic field is applied, it is possible to obtain the reproduction signal generated by the domain wall displacement only in the upstream area in the optical beam advance direction, so that the reproduction signal having a near rectangular waveform as shown in FIG. 8D can be obtained.

The invention therefore proposes a method of determining the strength of a reproducing magnetic field which is to be applied to suppress the displacement of a domain wall in the downstream area in the optical beam advance direction to reproduce information by using the reproduction signal generated by domain wall displacement only in the upstream area in the optical beam advance direction.

The operation of a reproducing magnetic field test of this embodiment will be described with reference to FIG. 4 showing the structure of the apparatus and flow charts of FIGS. 5A to 5F and FIG. 6.

First a record mark pattern is recorded in a predetermined reproducing magnetic field test region by the record method described above. The record power is set to a predetermined value. In the case of magnetic field modulation record, the margin of the record power is relatively broad. The record power is determined in accordance with a linear velocity, an atmospheric temperature and the like. The reproducing magnetic field text region is not limited to a particular region, and it can be determined while a variation in the circumferential and radial direction characteristics of an optical disk and the like is taken into consideration.

For example, a test signal is recorded and reproduced in a plurality of regions in the circumferential direction of an optical disk. In accordance with the results of such test operations, the strength of a reproducing magnetic field can be determined.

It has been confirmed that the longer a record mark, the higher a strength of the reproducing magnetic field is required in order to suppress the domain wall displacement in the downstream area in the optical beam advance direction. It is therefore preferable for a test operation to use a repetition pattern of longest record marks from among modulation codes to be used.

Selection of the record mark length depends on a delay amount of a domain wall displacement signal in the downstream area in the optical beam advance direction, from that in the upstream area. This delay amount corresponds to a distance between the front and back ends of the constant temperature line in the area equal to or higher than the critical temperature Ts in the optical beam advance direction shown in FIG. 8A. If the record mark length is set to the distance divided by an odd number, or to a value near to it, then the domain wall displacement signal in the upstream area in the optical beam advance direction is superposed in an inverse phase upon the domain wall displacement signal in the downstream area. The superposition phase is changed by the delay amount of the domain wall displacement reproduction signal in the downstream area, and this delay amount changes with an atmospheric temperature, a reproduction power and the like. With this change in the superposition phase, the amplitude of a reproduction envelope signal changes considerably irrespective of a presence/absence of the reproducing magnetic field. It is therefore preferable not to set the record mark length to the distance divided by an odd number, or to a value near to it.

It is preferable to set the record mark length to an even-number divided value or near to it, of the distance between the front and back ends of the constant temperature line in the area equal to or higher than the critical temperature Ts in the optical beam advance direction shown in FIG. 8A. Namely, it is preferable to set the record mark length so that the domain wall displacement signal in the upstream area in the optical beam advance direction is superposed in the same phase upon the domain wall displacement signal in the downstream area. Although the distance between the front and back ends of the constant temperature line of the area equal to or higher than the critical temperature Ts in the optical beam advance direction, depends upon the reproduction conditions such as a linear velocity and a reproduction power, it is assumed to be 1.5 $\mu$m in this embodiment.

It is also assumed that the record mark pattern is a repetition pattern of record marks having a length of 0.6 $\mu$m.

Figure 5:
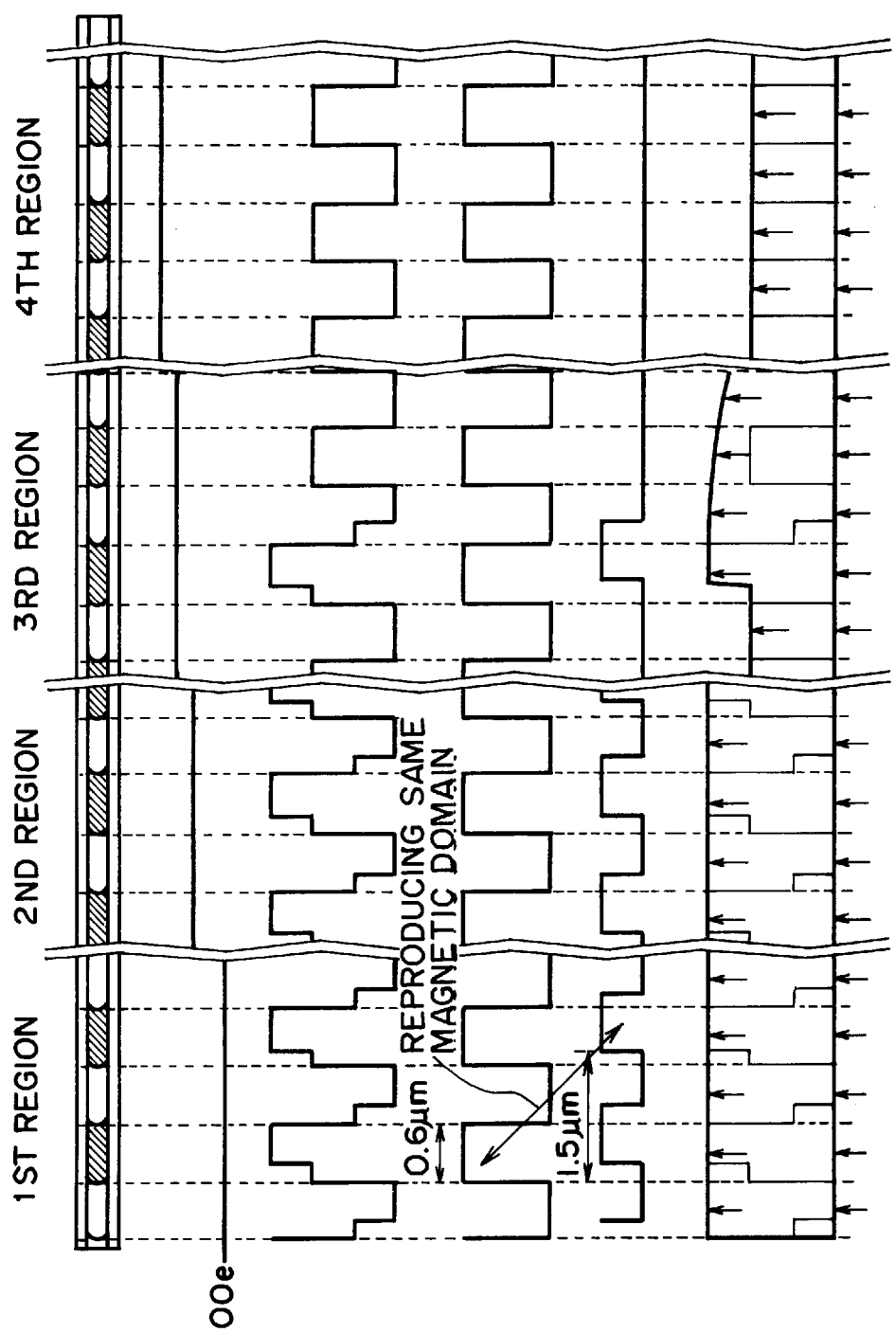
FIGS. 5A, 5B, 5C, 5D, 5E and 5F are diagrams illustrating the operation of the apparatus shown in FIG. 4.

At the same time when the record power is supplied, a modulation magnetic field corresponding to the record pattern is applied to the area where the optical beam is applied. During the cooling process from the raised temperature state of the record medium caused upon application of the optical beam, the record marks corresponding to the applied record magnetic field directions are formed. FIG. 5A is a schematic diagram showing the record mark pattern. A hatched portion and a meshed portion shown in FIG. 5A are magnetic domains having opposite magnetization directions, for example, the former corresponding to an upward magnetic domain and the latter corresponding to a downward magnetic domain.

Both side regions sandwiching magnetic domains are formed in advance by annealing the regions of the record medium at a high temperature by applying a high output power laser to decompose the regions and make the domain wall of each record mark not to constitute a closed loop. This process facilitates a smooth displacement of the domain wall. The record mark pattern already recorded may be used instead of recording it each time the reproducing magnetic field test is performed.

The operation of the reproducing magnetic field setting test will be described. FIG. 5B illustrates a change in the reproducing magnetic field strength set in accordance with a magnetic field strength control signal supplied from the controller 16, under the conditions that the magnetic head driver 18 is switched to a DC magnetic field generation mode or reproducing magnetic field generation mode in response to a control signal from the controller 16.

FIG. 5C shows reproduction signals corresponding to the reproducing magnetic field intensities. The reproduction signals shown in FIG. 5C also include a reproduction signal generated by the domain wall displacement phenomenon in the upstream area in the optical beam advance direction and a reproduction signal generated by the domain wall displacement phenomenon in the downstream area. A relative shift between the two reproduction signals is assumed in this embodiment to be about 1.5 $\mu$m, although it depends on the reproduction conditions such as a linear velocity and a reproduction power.

FIG. 5D shows domain wall displacement signals in the upstream area in the optical beam advance direction, and FIG. 5E shows domain wall displacement signals in the downstream area in the optical beam advance direction. FIG. 5F shows the waveforms of envelopes of the reproduction signals output from the envelope detection circuit 19. An arrow (↑) shown in the envelope waveform indicates a sampling point by the sampling and A/D converting circuit 20. Although the number of sampling points is not particularly limited, it is preferable to use as many sampling points as possible in order to provide the effects of suppressing domain displacement in the downstream area in the optical beam advance direction, when considering the circumferential variation in the characteristics of a recording medium. It is also preferable to execute the reproducing magnetic field test at a plurality of circumferential points. A narrow line shown in FIG. 5F indicates a reproduction signal shown in FIG. 5C.

The sampling period is preferably set to the record mark period in order to detect all record marks to be tested, and in other words preferably set to synchronize reproduction signals.

Next, with reference to FIGS. 5A to 5F, a reproduction signal, a domain wall displacement phenomenon in the downstream area in the optical beam advance direction and an envelope waveform of the reproduction signal will be described at each reproducing magnetic field strength.

In FIGS. 5A to 5F, as shown in a first region, if the reproducing magnetic field is not applied, the domain wall displacement phenomenon occurs both in the upstream and downstream areas in the optical beam advance direction. Therefore, the reproduction signal is a superposed signal of two signals. The envelope detection signal shown in FIG. 5F has a waveform simply adding the signal shown in FIG. 5D and the signal shown in FIG. 5C.

By using the amplitude of this envelope detection signal as a reference value, the strength of the reproducing magnetic field to be applied is sequentially increased to detect the amplitude values of the reproduction envelopes in second to fourth regions.

In the second region, although the reproducing magnetic field is applied, it is too weak so that the domain wall displacement in the downstream area in the optical beam advance direction cannot be suppressed. Therefore, the domain wall displacement reproduction signal in the downstream area in the optical beam advance direction is superposed and a reproduction signal has an amplitude near to that when the reproducing magnetic field is not applied. The amplitude value detected from the envelope signal is the same as the reference value when the reproducing magnetic field is not applied.

In the third region, the strength of the reproducing magnetic field applied is further raised. In this case, although the domain wall displacement phenomenon in the downstream area in the optical beam advance direction occurs, it is only partial. Therefore, the domain wall displacement phenomenon in the downstream area in the optical beam advance direction is intermittent and the envelope detection signal varies greatly. The falling edge of the envelope detection signal in this region lowers at a discharge time constant of the peak detection circuit.

In the fourth region, the strength of the reproducing magnetic field applied is raised more than that in the third region. In this case, the domain wall displacement phenomenon in the downstream area in the optical beam advance direction can be suppressed sufficiently and the reproduction signal by domain wall displacement in the downstream area is not generated. Therefore, the reproduction signal is formed only by the domain wall displacement phenomenon in the upstream area in the optical beam advance direction. The reproduction signal envelope has an amplitude smaller than the reference value in the first region where the reproducing magnetic field is not applied.

Figure 6:
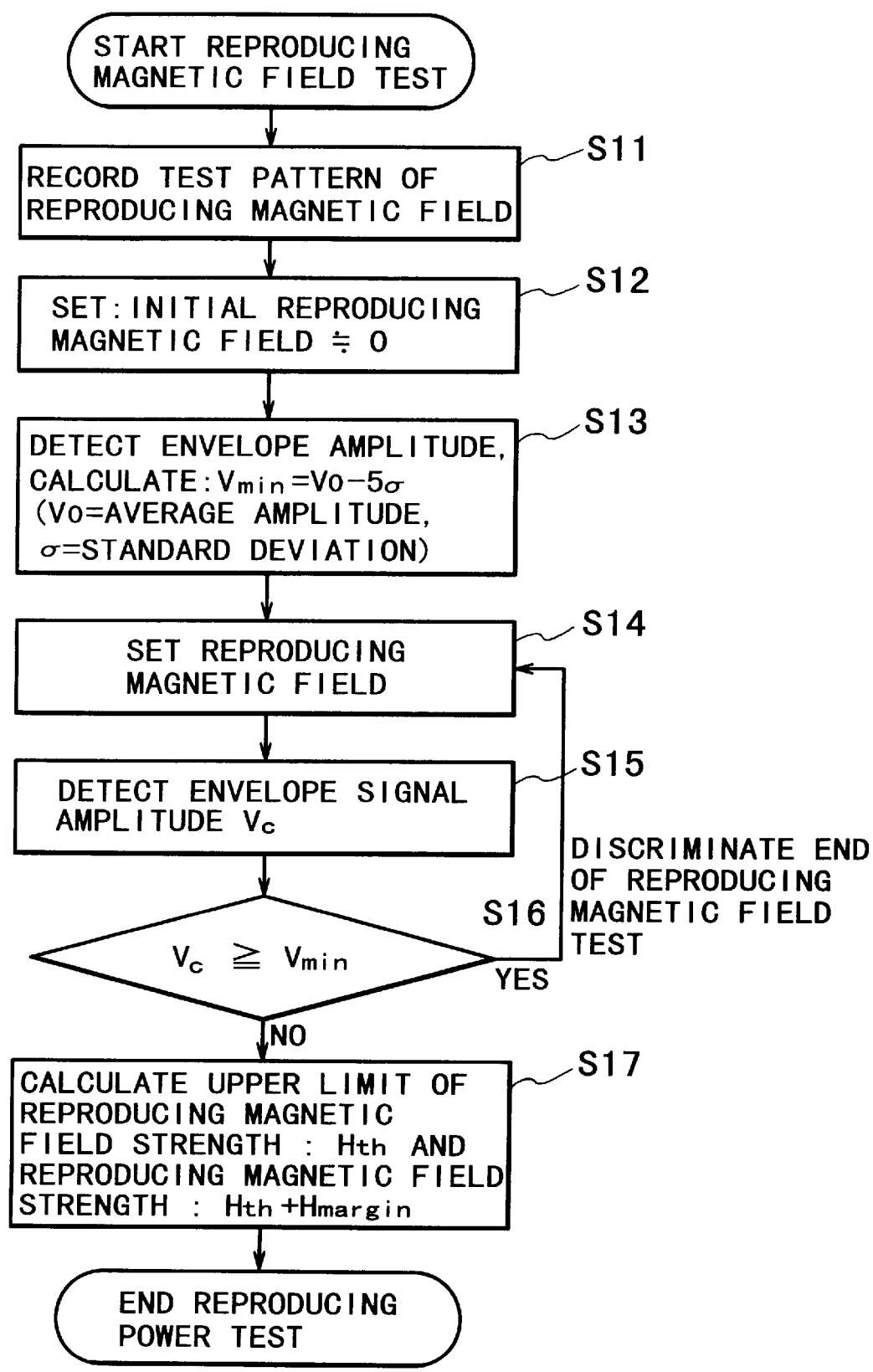
FIG. 6 is a flow chart illustrating the operation of the apparatus shown in FIG. 4.

A method of processing the envelope detection signals obtained in the first to fourth regions will be described with reference to the flow chart of FIG. 6.

A reproducing magnetic field test is performed and the test pattern is recorded (S11) and the reproducing magnetic field is set approximately to 0 for the first region (S12). Next, the envelope detection signal is sampled and A/D converted. An amplitude value of the envelope detection signal is calculated from the peak and bottom values at each sampling point. The average value V0 of amplitude values and a standard deviation value $\sigma$ of amplitude values are calculated. In accordance with these values, a minimum amplitude value when the domain wall displacement in the downstream area in the optical beam advance direction occurs, is defined.

In this embodiment, the minimum amplitude value when the domain wall displacement in the downstream area in the optical beam advance direction occurs, is set, for example, to Vmin =V0−5$\sigma$ which is used for a judgement whether or not the domain wall displacement in the downstream area in the optical beam advance direction occurs (S13). Next, in accordance with the minimum amplitude value Vmin and the like, the strength of the reproducing magnetic field and the like are set (S14).

In the second to fourth regions, a difference between the peak and bottom detection signals is calculated at each sampling point to obtain an envelope amplitude value Vc (S15). This amplitude value Vc is compared with Vmin. If Vc≧Vmin, then it means that the domain displacement phenomenon in the downstream area in the optical beam advance direction cannot be suppressed sufficiently in the second or third region, and the flow immediately advances to the step of raising the reproducing magnetic field strength (S16) to thereafter repeat the steps to detect the envelope signal amplitude value (S14 to S16).

It is proper to set an incremental value of the reproducing magnetic field to 20 to 30 oersted (Oe), although it depends on the final reproducing magnetic field strength.

If Vc<Vmin is satisfied in the whole of the reproducing magnetic field test region (in the fourth region), the reproducing magnetic field strength Hth used in this case is a lower limit of the reproducing magnetic field strength necessary for suppressing the domain wall displacement phenomenon in the downstream area in the optical beam advance direction.

The controller 16 adds a margin Hmargin, e.g., 50 oersted (Oe), of the reproducing magnetic field strength to the lower limit reproducing magnetic field strength Hth, and the reproducing operation is executed by using Hth+50 oersted (Oe) as the reproducing magnetic field strength for data reproduction (S17).

The magnetic field strength margin may be se t smaller as the reproducing magnetic field test is performed more frequently. In this embodiment, although the minimum amplitude value Vmin when the domain wall displacement phenomenon in the downstream area in the optical beam advance direction occurs, is calculated by using the standard deviation σ, the invention is not limited only thereto. For example, the minimum amplitude value may be defined by a ratio or the like of the average amplitude value V0. If the reproducing magnetic field is applied in a phase opposite to that of the embodiment, the domain displacement signal (DC components) in the downstream area in the optical beam advance direction operates in the opposite polarity. However, the method and apparatus of this embodiment are also applicable to this case. The application direction of the reproducing magnetic field is not particularly limited and it is sufficient if the direction of the reproducing magnetic field is set to the same direction as used for data reproduction.

What is claimed is:

1. A method for determining a strength of a reproducing magnetic field of an apparatus for reproducing information from a magneto-optical recording medium by applying an optical beam to the magneto-optical recording medium while applying the reproducing magnetic field, the magneto-optical recording medium including a record storage layer and a domain wall displacement layer each made of a magnetic film, the method comprising the steps of:

recording a test signal having a predetermined pattern on the medium;

applying the reproducing magnetic field to the medium and changing the strength of the reproducing magnetic field while simultaneously scanning the medium with the optical beam to reproduce the recorded test signal;

detecting an amplitude of the reproduced test signal; and setting as the strength of the reproducing magnetic field a value of a predetermined margin added to the strength of the reproducing magnetic field applied when the detected amplitude satisfies a predetermined condition.

2. A method for reproducing information from a magneto-optical recording medium by applying an optical beam to the magneto-optical recording medium while applying a reproducing magnetic field to the recording medium, the magneto-optical recording medium including a record storage layer and a domain wall displacement layer each made of a magnetic film, the method comprising the steps of:

recording a test signal having a predetermined pattern in a region of the medium other than a region where the information is recorded, prior to reproduction of the information;

applying the reproducing magnetic field to the medium and changing the strength of the reproducing magnetic field while simultaneously scanning the medium with the optical beam to reproduce the recorded test signal;

detecting an amplitude of the reproduced test signal;

setting as the strength of the reproducing magnetic field a value of a predetermined margin added to the strength of the reproducing magnetic field applied when the detected amplitude satisfies a predetermined condition; and reproducing information by scanning the region of the medium where the information is recorded while applying the reproducing magnetic field having the strength set in said setting step.

3. A method according to claim 1 or 2, wherein the test signal is a repetition pattern of longest record marks among record marks representative of the information recorded in the medium.

4. A method according to claim 1 or 2, wherein the reproduced test signal is directly sampled to detect the amplitude of the reproduced test signal.

5. A method according to claim 1 or 2, wherein the reproduced test signal is envelope-detected and a detected envelope is sampled to detect the amplitude of the reproduced test signal.

6. A method according to claim 1 or 2, wherein the medium is a disk medium, a test operation including recording and reproducing a test signal is performed at a plurality of regions along a circumferential direction of the medium, and the strength of the reproducing magnetic field is determined in accordance with results of test operations.

7. An apparatus for recording and reproducing information in and from a magneto-optical recording medium, comprising:

an optical head for applying an optical beam to the medium to record and reproduce information;

a magnetic head for applying a magnetic field to a region of the medium where the optical beam is applied, said magnetic head applying a modulated magnetic field to the medium when information is recorded, and applying a reproducing magnetic field when information is reproduced;

means for displacing the medium relative to said optical head and said magnetic head; and setting means for setting a strength of the reproducing magnetic field, said setting means recording a test signal having a predetermined pattern on the medium using said optical head and said magnetic head, applying the reproducing magnetic field to the medium and changing the strength of the reproducing magnetic field using said magnetic head while simultaneously reproducing the recorded test signal using said optical head, detecting an amplitude of the reproduced test signal, and setting as the strength of the reproducing magnetic field a value of a predetermined margin added to the strength of the reproducing magnetic field applied when the detected amplitude satisfies a predetermined condition.

8. An apparatus according to claim 7, wherein the test signal is a repetition pattern of longest record marks among record marks representative of the information recorded in the medium.

9. An apparatus according to claim 7, wherein said setting means includes a sampling circuit for sampling the reproduced test signal and a controller for determining the strength of the reproducing magnetic field in accordance with signals sampled by the sampling circuit.

10. An apparatus according to claim 7, wherein said setting means includes a circuit for envelope-detecting the reproduced test signal, a sampling circuit for sampling an envelope-detected signal and a controller for determining the strength of the reproducing magnetic field in accordance with signals sampled by the sampling circuit.

11. An apparatus according to claim 7, wherein the medium is a disk medium, and said setting means performs a test operation including recording and reproducing the test signal at a plurality of regions along a circumferential direction of the medium, and determines the strength of the reproducing magnetic field in accordance with results of test operations.

* * * * *

UNITED STATES PATENT AND TRADEMARK OFFICE
CERTIFICATE OF CORRECTION

PATENT NO. : 6,249,490 B1
DATED : June 19, 2001
INVENTOR(S) : Yasuyuki Miyaoka

It is certified that error appears in the above-identified patent and that said Letters Patent is hereby corrected as shown below:

Column 9,
Line 14, "t he" should read -- the --.
Line 22, "T his" should read -- This --.

Column 12,
Line 66, "to" (1st occurrence) should read -- from --.

Column 13,
Line 14, "se t" should read -- set --.

Column 15,
Line 6, "the" should read -- a --.

Signed and Sealed this

Twenty-first Day of May, 2002

*Attest:*

*Attesting Officer*

JAMES E. ROGAN
*Director of the United States Patent and Trademark Office*